US012639165B2

(12) United States Patent
Zlotnik et al.

(10) Patent No.: US 12,639,165 B2
(45) Date of Patent: May 26, 2026

(54) CORRECTION MATRIX RESET

(71) Applicant: Micron Technology, Inc., Boise, ID (US)

(72) Inventors: Leon Zlotnik, Camino, CA (US); Fan Zhou, El Dorado Hills, CA (US)

(73) Assignee: Micron Technology, Inc., Boise, ID (US)

( * ) Notice: Subject to any disclaimer, the term of this patent is extended or adjusted under 35 U.S.C. 154(b) by 37 days.

(21) Appl. No.: 18/774,652

(22) Filed: Jul. 16, 2024

(65) Prior Publication Data

US 2025/0045156 A1     Feb. 6, 2025

Related U.S. Application Data

(60) Provisional application No. 63/517,540, filed on Aug. 3, 2023.

(51) Int. Cl.
G06F 11/10          (2006.01)

(52) U.S. Cl.
CPC ...... G06F 11/1068 (2013.01); G06F 11/1004 (2013.01)

(58) Field of Classification Search
CPC ............. G06F 11/1068; G06F 11/1004; G06F 11/1012; G06F 17/16; G06F 1/24
See application file for complete search history.

(56) References Cited

U.S. PATENT DOCUMENTS

| | | | |
|---|---|---|---|
| 8,954,822 B2 | 2/2015 | Frayer et al. | |
| 9,509,342 B2 | 11/2016 | Vernon | |
| 2013/0329085 A1* | 12/2013 | Kikuchi | H04N 5/76 |
| | | | 348/231.99 |
| 2021/0182077 A1* | 6/2021 | Chen | G06F 40/263 |

* cited by examiner

*Primary Examiner* — Thien Nguyen
(74) *Attorney, Agent, or Firm* — Brooks, Cameron & Huebsch, PLLC

(57) ABSTRACT

A decoding operation is performed by receiving a command to read a correction matrix comprising multiple bit-values from memory of a decoder. The decoding operation also includes, responsive to receipt of the command, generating, using circuitry of a decoder, a predetermined correction matrix comprising a same bit-value. The decoding operation further includes providing the predetermined correction matrix to a decision engine to perform the decoding operation.

20 Claims, 4 Drawing Sheets

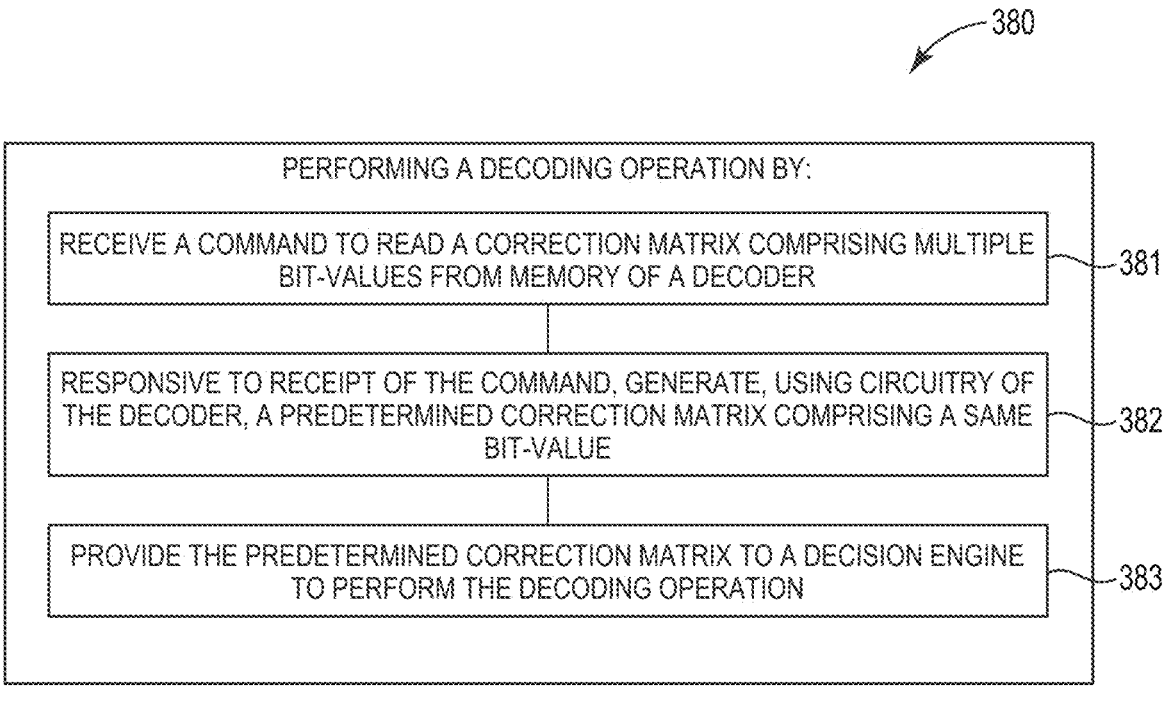

—380

PERFORMING A DECODING OPERATION BY:

RECEIVE A COMMAND TO READ A CORRECTION MATRIX COMPRISING MULTIPLE BIT-VALUES FROM MEMORY OF A DECODER —381

RESPONSIVE TO RECEIPT OF THE COMMAND, GENERATE, USING CIRCUITRY OF THE DECODER, A PREDETERMINED CORRECTION MATRIX COMPRISING A SAME BIT-VALUE —382

PROVIDE THE PREDETERMINED CORRECTION MATRIX TO A DECISION ENGINE TO PERFORM THE DECODING OPERATION —383

FIG. 3

CORRECTION MATRIX RESET

PRIORITY INFORMATION

This application claims the benefits of U.S. Provisional Application No. 63/517,540, filed on Aug. 3, 2023, the contents of which are incorporated herein by reference.

TECHNICAL FIELD

Embodiments of the disclosure relate generally to resetting a correction matrix, and more specifically, relate to resetting a correction matrix.

BACKGROUND

Various types of electronic devices such as digital logic circuits and memory systems may store and process data. A digital logic circuit is an electronic circuit that processes digital signals or binary information, which can take on two possible values (usually represented as 0 and 1). The digital logic circuit can use logic gates to manipulate and transform the digital signals or binary information. Digital logic circuits can be, for example, used in a wide range of electronic devices including computers, calculators, digital clocks, and many other electronic devices that employ digital processing. Digital logic circuits can be designed to perform specific logical operations on digital inputs to generate digital outputs, and, in some instances, can be combined to form more complex circuits to perform more complex operations. A memory device can include one or more memory devices that store data. The memory devices can be, for example, non-volatile memory devices and volatile memory devices. In general, a host system can utilize a memory system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 3 is a flow diagram corresponding to a method for resetting a correction matrix in accordance with some embodiments of the present disclosure.

DETAILED DESCRIPTION

Figure 1:
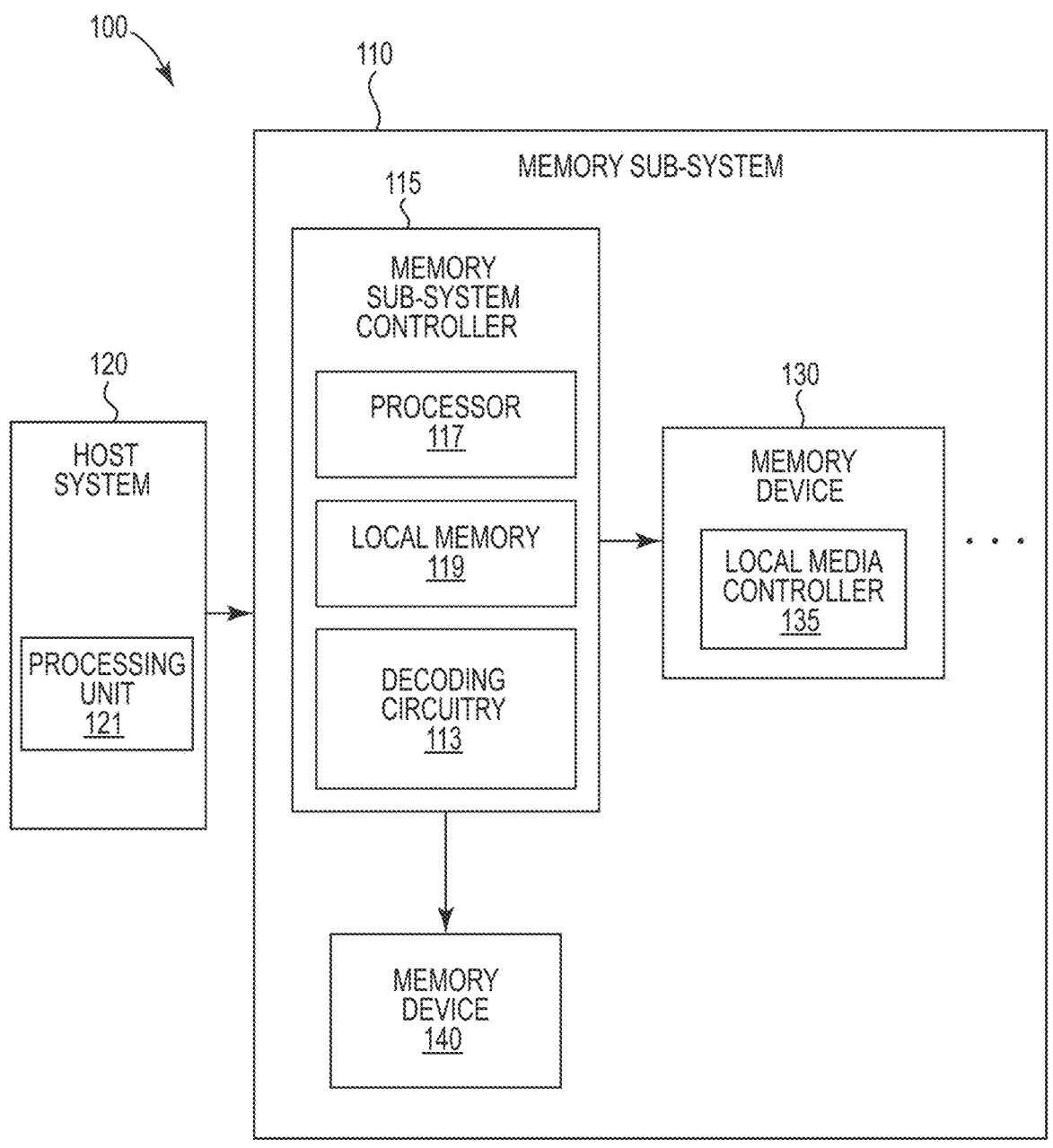
FIG. 1 illustrates an example computing system that includes a memory sub-system in accordance with some embodiments of the present disclosure.

Aspects of the present disclosure are directed to resetting a correction matrix in a decoder. In some embodiments, a decoder can perform decoding operations and, in particular, decoding operations performed within a memory sub-system. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

Although some non-limiting examples herein are generally described in terms of applicability to memory sub-systems and/or to memory devices, embodiments are not so limited, and aspects of the present disclosure can be applied as well to a system-on-a-chip, computing sub-system, data collection and processing, storage, networking, communication, power, artificial intelligence, control, telemetry, sensing and monitoring, digital entertainment and other types of systems/sub-systems and/or devices, Accordingly, aspects of the present disclosure can be applied to these components in order to reset a correction matrix in a decoder, as described herein.

Data can be written to and stored by one or more digital logic circuits and/or memory systems. The data (e.g., one or more codewords that can correspond to, for example, user data) can be encoded prior to being transferred to the memory device(s) and/or prior to being written to (e.g., stored) by the memory device(s). Upon retrieval of the data, the data is generally decoded. There are many techniques for decoding of codewords, some non-limiting examples of which include maximum likelihood decoding, minimum distance decoding (e.g., decoding techniques that seek to minimize a Hamming distance associated with a codeword), list decoding, linear decoding, bit-flip decoding, and/or information set decoding, among others.

As will be appreciated such decoding techniques can be employed to detect bit errors in data (e.g., codewords) based on determining that bits associated with the data have incorrect states (e.g., a "1" where a "0" should be and vice versa). Some of the more common decoding techniques employed include Hamming codes, Reed-Solomon (RS) codes, Bose-Chaudhuri-Hochquenghem (BCH) codes, circular redundancy check (CRC) codes, Golay codes, Reed-Muller codes, Goppa codes, neighbor-cell assisted error correction codes, low-density parity-check (LDPC) error correction codes, Denniston codes, and syndrome decoding, among others. While each of these decoding techniques enjoy their own benefits, they also can experience various drawbacks. For example, more accurate decoding techniques tend to consume more power and/or time, while less accurate decoding techniques may be performed faster and may consume less power.

In some approaches decoding of bit strings and/or syndromes is achieved by processing the bit strings and/or syndromes through a series of flip-flops (which can include thousands of flip-flops) and applying a logical operation (e.g., logical AND, OR, XOR operations, etc.) to the bit strings and/or syndromes. In such approaches, the quantity of inputs of the logical operation is generally equal to the quantity of flip-flops used to process the bit strings and/or syndromes. If performance of the logical operation returns a particular value (e.g., a logical value of "1" in the case of a logical AND operation), the bit strings and/or syndromes are considered to be decoded.

However, prior to performing decoding operations, a matrix (e.g., a correction matrix) corresponding to the codewords can be initialized such that the correction matrices comprise 0-bits and do not comprise 1-bits. As used herein, a 0-bit and/or a 1-bit can refer to a logical value of "0" and "1", respectively. References to a 0-bit or a 1-bit can include references to a logical value of "0" or a logical value of "1", respectively. The correction matrices can be stored in a correction (CR) memory. The correction matrices can be used to track which bits of the codeword have been corrected or have not been corrected. For example, the correction matrix having a first bit-value in a first bit can indicate that a corresponding bit (e.g., first bit) of the codeword has not yet been corrected. The correction matrix having a second bit-value in a second bit can indicate that a corresponding bit (e.g., second bit) of the codeword has been corrected. In various instances, a codeword can be corrected if the correction matrix comprises bits having the second bit-value. In various instances, the first bit-value can be a 0-bit and the second bit-value can be a 1-bit. However, other bit-values can be selected.

The initialization of the correction matrix can be performed by initializing the memory (e.g., CR memory) that stores the correction matrix. For example, memory cells that store the correction matrix can be configured (e.g., initialized) to store a first values (e.g., 0-bit values) and not 1-bit values (e.g., 1-bit values). The 0-bits can represent the bits of the codeword that have not been corrected. However, initialization of the memory consumes time (e.g., write cycles) and power (e.g., 0-bits are written sequentially to the memory cells that store the codeword). Additionally, in a first iteration of the decoding operations of a codeword, the correction matrix (e.g., composed of 0-bit values) can be readout which can consume time and power.

In order to address these and other deficiencies of current approaches, embodiments of the present disclosure allow for a first correction matrix comprising 0-bits and no 1-bits to be generated without initializing the memory that stores the second correction matrix corresponding to a decoding of a previous codeword. The second correction matrix can be left over from the decoding of a previous codeword. Generating a correction matrix (e.g., first correction matrix) comprising 0-bits instead of initializing a corresponding correction matrix (e.g., second correction matrix) and reading the corresponding correction matrix can be referred to as bypassing a memory read. A memory read can be bypassed during or as part of a first iteration of the decoding operations to reduce the power utilized to perform the read operation (e.g., initialize and read the correction matrix stored in the memory). For example, instead of initializing and reading a correction matrix that is stored in memory, a corresponding correction matrix can be generated and can be provided to a decoding engine thereby bypassing the reading of the correction matrix such that no power or time is utilized to read the correction matrix that is stored in the memory and the initialization of the correction matrix which also consumes time and power.

In subsequent iterations of the decoding operations, the reading of the memory that stores a correction matrix can also be bypassed. For example, if portions of the correction matrix have not been written yet (e.g., updated) in a current or in previous iterations of the decoding operations, then the reading of the correction matrix can be bypassed by generating a correction matrix comprising 0-bits. The performance of the decoding operations can include storing the results of the decoding operation in memory. For example, the correction matrix can be stored (e.g., updated) in memory as part of performing the decoding operations. The correction matrix that is not updated can be referred to as not having been written to the memory given that the correction matrix can have bit-values that correspond to a decoding of a different codeword. For example, after decoding a first codeword, the correction matrix remains stored in the memory. If the correction matrix is not updated, then the bits of the correction matrix have not been written to for a current iteration of decoding operations performed to decode a new codeword which associates the correction matrix with a previously decoded codeword instead of the correction matrix currently being decoded.

The examples described herein refrain from initializing the memory that stores the correction matrix. The memory is not initialized because the memory is not utilized in a first iteration and/or as part of the first iteration of the decoding operations. In various instances, the first iteration may be considered complete after the memory is updated. The decoding operations can be performed as part of the first iteration. The decoding operations can be performed prior to the updating of the memory. Not utilizing the memory in a first iteration of the decoding operations saves power and improves performance as compared to initializing the memory as part of a first iteration of the decoding operation. The memory may not be initialized but may be updated after a first iteration of the decoding operations. In various instances, the memory can be updated as part of the first iteration. For example, the updating of the memory can conclude the first iteration. The decoding operations can be executed without waiting for the memory to be initialized (e.g., set to 0-bit values). Although the examples described herein are provided to generate correction matrices having 0-bits and no 1-bits, the correction matrices can be generated having 1-bits and no 0-bits or any combination of 1-bits and 0-bits depending on the type of decoding operations that are performed.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

In other embodiments, the computing system 100 can be deployed on, or otherwise included in a computing device such as a desktop computer, laptop computer, server, network server, mobile computing device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 includes a processing unit 121. The processing unit 121 can be a central processing unit (CPU) that is configured to execute an operating system. In some embodiments, the processing unit 121 comprises a complex instruction set computer architecture, such an x86 or other architecture suitable for use as a CPU for a host system 120. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via the same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include decoding circuitry 113. Although not shown in FIG. 1 so as to not obfuscate the drawings, the decoding circuitry 113 can include various circuitry to facilitate aspects of the disclosure described herein. In some embodiments, the decoding circuitry 113 can include special purpose circuitry in the form of an ASIC, FPGA, state machine, hardware processing device, and/or other logic circuitry that can allow the decoding circuitry 113 to orchestrate and/or perform decoding operations, particularly with respect to a system-on-chip, in accordance with the disclosure. The decoding circuitry 113 is discussed in more detail in connection FIG. 2, herein.

In some embodiments, the memory sub-system controller 115 includes at least a portion of the decoding circuitry 113. For example, the memory sub-system controller 115 can include a processor 117 (processing device) configured to execute instructions stored in local memory 119 for performing the operations described herein. In some embodiments, the decoding circuitry 113 is part of the host system 110, an application, or an operating system. The decoding circuitry 113 can be resident on the memory sub-system 110 and/or the memory sub-system controller 115. As used herein, the term "resident on" refers to something that is physically located on a particular component. For example, the decoding circuitry 113 being "resident on" the memory sub-system 110 refers to a condition in which the hardware circuitry that comprises the decoding circuitry 113 is physically located on the memory sub-system 110. The term "resident on" may be used interchangeably with other terms such as "deployed on" or "located on," herein.

Figure 2:
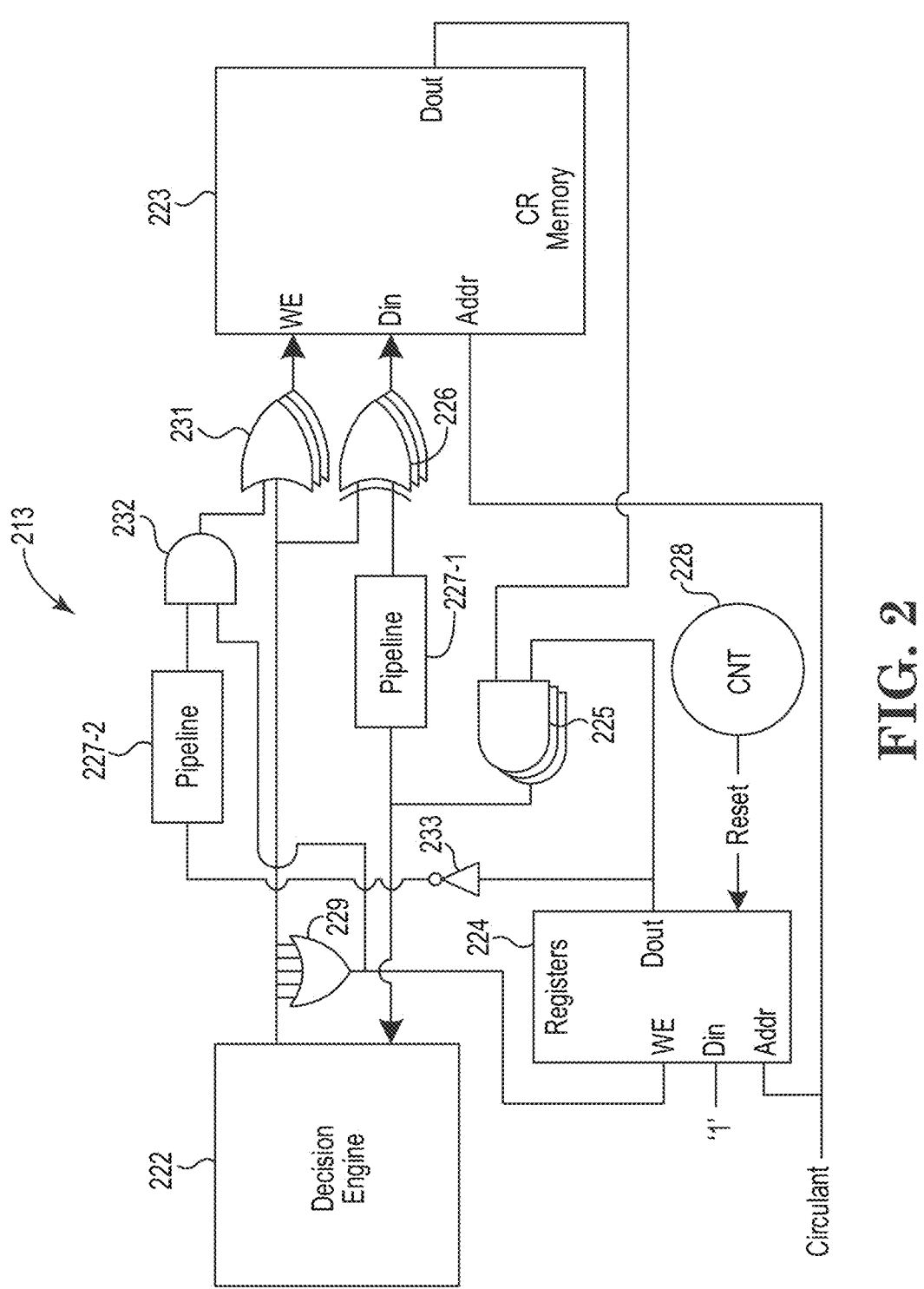
FIG. 2 illustrates an example of decoding circuitry in accordance with some embodiments of the present disclosure.

FIG. 2 illustrates an example of decoding circuitry 213 in accordance with some embodiments of the present disclosure. The decoding circuitry 213 can include a decision engine 222, CR memory 223, registers 224 (e.g., circulant valid registers), AND gates 225, 232, XOR gates 226, pipeline circuitry 227-1, 227-2, and control circuitry (e.g., CNT) 228. The decoding circuitry 213 also includes OR gates 229, 231. Although not explicitly shown in FIG. 2, one or more of the components illustrated can be one of a plurality of such components. For example, the AND gates 225 can include multiple AND gates (e.g., 16, 32, 128, etc.) even though a single AND gate is shown in FIG. 2.

As used herein, the CR memory 223 can comprise hardware and/or firmware configured to store a correction matrix. As used herein, the term "codeword" generally refers to a data word having a specified size (e.g., 4 KB, etc.) that is encoded such that the codeword can be individually protected by some error encoding and/or decoding scheme. For example, a "codeword" can refer to a set of bits (e.g., a bit string and/or a syndrome) that can be individually encoded and/or decoded. The term "correction matrix" generally refers to a data word having a specific size (e.g., 4 KB, etc.) that is used to track which bits of the codeword have been corrected and/or which bits of the codeword have yet to be corrected (e.g., have not been corrected). The size of the correction matrix can be the same size as the codeword. Each of the bits of the correction matrix can correspond to a different bit of the codeword.

The CR memory 223 can be an array of memory cells and/or an array of flip-flops and/or latches, etc. As shown in FIG. 2, the CR memory 223 is coupled to the decision engine 222. The CR memory 223 can be coupled to the decision engine 222 utilizing the AND gates 225. The AND gates 225 can receive bits from the registers 224 and the CR memory 223. For example, the CR memory 223 can provide the correction matrix while the registers 224 provide an activation bit which can be referred to as a bit-mask. The correction matrix and the activation bit can be associated with an address. For example, the codeword can be stored in an address. The address of the codeword can be used to associate the correction matrix and the activation bit with the codeword.

The output of the AND gates 225 can be provided to the decision engine 222 and the pipeline 227-1. The decision engine 222 can perform a number of decoding operations on a codeword and, based on whether the decision engine 222 corrects any of the bits of the codeword, can flip a bit of the correction matrix provided by the AND gates 225. The decision engine 222 can provide a number of outputs to the registers 224 via the OR gate 229 and to the CR memory 223 via the OR gates 231 and the XOR gates 226. The pipeline circuitry 227-2 together with the AND gate 232, the OR gates 231, and the XOR gates 226 can be utilized to store an entire updated correction matrix to the CR memory 223. The pipeline circuitry 227-1 together with the OR gates 231 and the XOR gates 226 can be utilized to store portions of an updated correction matrix to the CR memory 223 as described below.

The decision engine 222 includes hardware circuitry that is configured to correct erroneous bits (e.g., bit-flip errors) in the bit strings and/or codewords. As used herein, a bit string can refer to a decoded codeword and a codeword can refer to an encoded bit string. The examples described herein can be applied to bit string and codewords. References to decoding a codeword can include performing error correction on the codeword and/or on a bit string. References to performing decoding operations on a bit string can include performing decoding operations on the codeword and/or performing error correction operations on the bit string.

In some embodiments, the decision engine 222 can cause one or more bits in the bit strings and/or codewords to be flipped based on a determined probability that such bits are erroneous. The probability that one or more bits in the bit strings and/or codewords is to be flipped can be determined using various linear codes, such as syndrome decoding codes, LDPC codes, etc. Embodiments are not limited to cases in which the decision engine 222 causes one or bits in the bit strings and/or codewords to be flipped based on a determined probability that such bits are erroneous (e.g., through the use of a linear decoding technique), however, and in some embodiments, the decision engine 222 can determine which bits of the bit strings and/or codewords are erroneous based on mathematical inference algorithms, machine learning algorithms, and/or other suitable techniques for determining which bits of the bit strings and/or codewords are erroneous.

In a simplified example that is provided for illustrative purposes, take a codeword that contains the following bit pattern: [1 0 0 1 0 1 1 0], the decision engine 222 may determine that the second bit (from the right) is likely to be erroneous and can therefore process the codeword to flip the second bit thereby yielding the following new codeword [1 0 0 1 0 1 0 0]. Embodiments are not limited to scenarios in which the decision engine 222 causes only a single bit to be flipped as part of decoding the codeword, however. For example, using the same initial codeword given above [1 0 0 1 0 1 1 0], the decision engine 222 may determine that the second bit, the third bit, and the eighth bit are likely to be erroneous and can therefore process the codeword to flip the second bit, the third bit, and the eighth bit thereby yielding the following codeword [0 0 0 1 0 0 0 0]. It is noted that these illustrative non-limiting examples can be part of an iterative decoding process in which the codewords are processed by the decision engine 222 multiple times in an effort to decode such codewords. Accordingly, the illustrative non-limiting example given above can represent operations performed by the decision engine 222 at a first iteration of the decoding process (e.g., decoding operations), or at any subsequent iteration of the decoding process.

Once the decision engine 222 has attempted to correct one or more erroneous bits in the bit strings and/or codeword, for example by flipping a value of one or more such bits from a logical value of "1" to a logical value of "0" or vice versa, the decision engine 222, the CR memory 223, and/or other circuitry can mask bits of the bit strings and/or codeword, using a correction matrix. In various examples, the correction matrix can be utilized in the decoding of each of the bits of the bit string and/or codeword and can be subject to correction during subsequent iterations of a decoding operation and/or may be processed by the decision engine during subsequent iterations of the decoding operation.

For example, using an initial bit pattern given above [1 0 0 1 0 1 1 0], the decision engine 222 may determine that the second bit, the fifth bit, and the seventh bit are likely to be erroneous and can therefore process the received bit string and/or codeword to flip the second bit, the fifth bit, and the seventh bit thereby yielding the following bit pattern [1 1 0 1 1 1 0 0]. The matrix (e.g., correction matrix) is then applied to the second bit, the fifth bit, and the seventh bit, as these bits were altered by the decision engine 222. In some embodiments, the bits having the correction matrix applied thereto (and/or the bits not having the correction matrix applied thereto) are written to the CR memory 223 (which can be a register, cache, or other collection of memory cells). In various examples, the correction matrix, syndromes, and/or other bits can be utilized to decode a codeword.

During a decoding of a codeword, a correction matrix stored in the CR memory 223, referred to as memory 223, can contain bits that were stored in the memory 223 during a previous decoding of a different codeword. For example, at the conclusion of a first decoding of a first codeword, the correction matrix can be modified to reflect the bits of the first codeword that were corrected and/or were not corrected. At the initiation of a second decoding of a second codeword, the correction matrix can continue to reflect the bits of the first codeword that were corrected and/or were not corrected. The correction matrix reflects the bits of the first codeword that were corrected and/or were not corrected until the correction matrix is initialized. As used herein, initializing the correction matrix includes storing a predetermined bit-value and not a different bit-value in memory cells that store the correction matrix.

The correction matrix can be updated, for example, by initializing the correction matrix to a predetermined bit-pattern. The correction matrix can also be updated after a first iteration of the decoding of the second codeword. Initializing the correction matrix and reading the newly initialized correction matrix, to provide to the decision engine 222, can utilize resources of the memory sub-system.

In a number of examples, a predetermined correction matrix can be generated utilizing the AND gates 225 and the registers 224 instead of initializing the correction matrix (e.g., writing a predetermined bit-pattern to the memory 223). Generating the predetermined correction matrix can utilize less resources than initializing the correction matrix and reading the correction matrix.

In a first iteration of decoding a codeword, instead of reading a correction matrix from the memory 223, the AND gates 225 can be configured to generate a predetermined correction matrix. In subsequent iterations of decoding the codeword, each of the AND gates 225 can receive a bit of the correction matrix from the memory 223. For example, if the correction matrix includes 128 bits, then there can be 128 AND gates 225, each AND gate receiving one of the 128 bits.

In the first iteration of the decoding the codeword, each of the AND gates 225 can receive a same bit from the registers 224. The same bit stored in the registers 224 can be associated with a same address that the correction matrix is associated with. The same bit can be utilized to activate the correction matrix or inactivate the correction matrix. For example, if the same bit is a first value (e.g., 0-bit), then the correction matrix can be inactive. If the same bit is a second value (e.g., 1-bit), then the correction matrix is active.

The AND gates 225 can provide the correction matrix if the bit received from registers 224 has a second value and can provide 0-bits if the bit received from the registers 224 has a first value. For instance, if a first AND gate receives a first bit from the correction matrix and a bit from the registers 224 having a first value (e.g., O-bit), then the AND gate performs an AND operation using the first bit of the correction matrix and the bit from the registers 224. Given that the bit from the registers 224 has the first value (e.g., 0-bit), the AND gate can provide a 0-bit instead of the first bit from the correction matrix. If the bit from the registers 224 has a second value (e.g., 1-bit), the AND gate can provide the first bit of the correction matrix regardless of whether the first bit of the correction matrix has a first value or a second value.

The AND gates 225 can generate a predetermined correction matrix. The AND gates 225 can provide a first value (e.g., 0-bit) if the bit from the registers 224 has a first value. Each of the AND gates 225 can provide the first value given that each of the AND gates 225 receives the bit from the registers 224. If each of the AND gates 225 provides a same bit, then the AND gates 225 can provide a predetermined correction matrix. The predetermined value of the predetermined correction matrix can be a 1-bit, a 0-bit, or a combination thereof, depending on the decoding scheme being utilized.

The registers 224 are hardware that is configured to store one or more bits. The registers 224 can be an array of memory cells and/or an array of flip-flops and/or latches, etc. At the beginning of each decoding of a codeword, the registers 224 can be reset to store a first value (0-bit). The control circuitry 228 can provide signals to the registers 224 to cause the registers to store a first value (e.g., 0-bit). The control circuitry 228 can reset the registers 224 synchronously or asynchronously. To reset the registers 224 synchronously the control circuitry 228 can provide signals to the registers 224 based on a clock signal and/or based on the decision engine 222 completing the decoding of a codeword. To reset the registers 224 asynchronously, the flip flops in the registers 224 can be reset without reference to a clock signal. The registers 224 can be reset before a new decoding operation begins.

The decision engine 222 can receive the predetermined correction matrix that was created by the AND gates 225 during a first iteration of a decoding of a codeword. The decision engine 222 can perform decoding operations. Responsive to performing the decoding operations, the decision engine 222 can flip one or more bits of the codeword. Responsive to updating one or more bits of the codeword, the decision engine 222 can provide a signal to the memory 223. The signal can correspond to the one or more bits of the codeword that were updated and to corresponding one or more bits of the predetermined correction matrix.

The one or more signals provided by the decision engine 222 can be received by the OR gates 229, 231. The OR gate 229 can be an X to 1 OR gate. For example, the decision engine 222 can be coupled to the memory 223 via a plurality of lines. The quantity of the lines (e.g., width of a bus) that couple the decision engine 222 to the memory 223 can be equal to the quantity of bits of a correction matrix and/or the predetermined correction matrix. If a first bit of the codeword is updated, then a decision engine 222 can provide a bit having a second bit-value (e.g., 1-bit) to the memory 223 utilizing a first line and can provide a number of bits having a first bit-value (e.g., 0-bit) to the memory 223 utilizing the remainder of the lines. The decision engine 222 can also provide the bit having the second bit-value and the number of bits having the first bit-value to the OR gate 229 and the OR gates 231.

The OR gate 229 can perform an OR operation utilizing the bit and the number of bits. Given that the bit has a second bit-value, the OR gate 229 can provide a second bit-value (e.g., 1-bit) to the registers 224. The registers 224 can store the second bit-value. In a subsequent iteration of the decoding of the codeword, the register 224 can provide a bit to the AND gates 225, where the bit has the second bit-value. Regardless of whether the decision engine 222 updates one bit or multiple bits of the codeword, the decision engine 222 can activate the correction matrix stored in the memory 223 by providing a bit having a second bit-value to the registers 224 via the OR gate 229. The registers 224 can store the bit having the second bit-value.

The OR gates 231 can also receive the signal provided from the decision engine 222 to the memory 223 and a signal received from the AND gate 232. The OR gates 231 can include a quantity of OR gates equal to the quantity of AND gates 225, the width of a bus of the memory, and/or the quantity of bits of the predetermined correction matrix generated by the AND gates 225. In various instances, the memory 223 can store multiple correction matrices per address. The quantity of OR gates and the quantity of AND gates 225 can be equal to a width of a bus of the memory 223. The OR gates 231 can be used to signal to the memory 223 to store an updated correction matrix and/or portions of the updated correction matrix responsive to updating one or more of the bits of the codeword in an iteration of the decoding of the codeword where the codeword is updated for the first time. In many instances, the codeword is updated by the decision engine 222 for the first time during a first iteration of the decoding of the codeword. For example, if the codeword is updated, then the decision engine 222 can provide at least one signal having a second bit-value (e.g., 1-bit) to the OR gates 231.

The OR gates 231 can also receive one or more bits from the AND gate 232 which are coupled to the pipeline 227-2 and the OR gate 229. The pipeline 227-2 is coupled to the registers 224 via the NOT gate 233. The bit provided by the registers 224 can be delayed using pipeline 227-2. For example, the registers 224 can provide a bit to the AND gate 232 via the pipeline 227-2 and the NOT gate 233. The AND gate 232 can also receive a bit from the OR gate 229.

The OR gates 231 can be used to cause the memory 223 to update the correction matrix. For example, the OR gates 231 can update the entire correction matrix in a same iteration that the correction matrix is to be updated for the first time (e.g., usually a first iteration). For example, if the decision engine 222 decides to update the correction matrix for a first time, the registers 224 can provide the bit-mask having a 0-bit. The NOT gate 233 can output a 1-bit. The pipeline 227-2 can delay the 1-bit and can provide the 1-bit to the AND gate 232. The OR gate 229 can output 1-bits if the decision engine 222 updates any of the bits of the correction matrix. The AND gate 232 can receive two 1-bits if the correction matrix is being updated for the first time. The AND gate 232 can output 1-bit to the OR gates 231 to cause the OR gates 231 to provide write enabled signals (e.g., comprising 1-bits) to the memory 223 to cause the entire correction matrix to be updated regardless of if the decision engine 222 intended the entire correction matrix to be updated or only a portion of the correction matrix to be updated. In subsequent iterations the registers 224 will provide a 1-bit which after being proceed by the NOT gate 233 can be provided to the AND gate 232 as a 0-bit which will cause the OR gates 231 to provide write enabled signals (e.g., comprising 1-bits) to the memory 223 if the decision engine 222 intended corresponding bits of the correction matrix to be updated (e.g., partial update of the correction matrix).

The memory 223, responsive to receipt of the bit-values from the OR gates 231, can store the bits provided by the XOR gates 226 to update the correction matrix. In a first iteration of the decoding of the codeword, the memory 223 can update each of the bits of the correction matrix. In subsequent iterations of the decoding of the codeword, the memory 223 can update one or more of the bits of the correction matrix as indicated by the write enable bits provided by the decision engine 222 to the memory 223. As used herein, the write enable bits are the signals provided from the decision engine 222 to the memory 223.

The XOR gates 226 can receive the write enable bits from the decision engine 222 and signals from the pipeline circuitry 227-1. The pipeline circuitry 227-1, 227-2 can comprise hardware configured to delay the output of the AND gates 225 as provided to the XOR gates 226 and the bit-mask provided to the AND gate 232. In a first iteration of the decoding of the codeword, the output of the AND gates 225 is the predetermined correction matrix generated by the AND gates 225. In subsequent iterations of the decoding of the codeword, the output of the AND gates 225 is the correction matrix stored in the memory 223. The pipeline circuitry 227-1 can delay the output of the AND gates 225 to align the output of the AND gates 225 with the write enable bits provided by the decision engine 222 to the XOR gates 226. Any bits provided by the decision engine 222 having a second bit-value can cause the XOR gates 226 to flip a corresponding bit from the outputs of the AND gates 225. For example, if one of the AND gates 225 provides a 0-bit to one of the XOR gates 226 and the decision engine 222 provides a 1-bit to the one of the XOR gates 226, then the one of the XOR gates 226 can output a 1-bit to the memory 223. The memory 223 can store the bit provided by the one of the XOR gates 226 if the corresponding bit provided by the decision engine 222 has a second bit-value (e.g., 1-bit) and can refrain from storing the bit provided by the one of the XOR gates 226 if the bit provided by the decision engine 222 has a first bit-value (e.g., 0-bit).

The quantity of XOR gates 226 can be equal to the quantity of AND gates 225, the quantity of OR gates 231, and/or the quantity of bits of the predetermined correction matrix. Each of the XOR gates 226 can be associated with a bit of the correction matrix and/or a bit of the codeword. For example, a first XOR gate can be associated with a first bit of the correction matrix and the codeword. If a first write enable bit provided by the decision engine 222 has a second bit-value, then the first XOR gate can provide a bit-value that the memory 223 can utilize to update a first bit of the correction matrix. In various instances, the decision engine 222 can provide multiple write enable bits concurrently. For example, the decision engine 222 can provide a first write enable bit and a tenth write enable bit having a second bit-value while the remainder of the write enable bits have a first bit-value. The XOR gates 226 can flip the first bit and the tenth bit provided by the AND gates 225 and can provide the remaining bits without flipping the remaining bits as provided by the AND gates 225. The memory 223 can store, during a first iteration of the decoding of the codeword, each of the bits as provided by the XOR gates 226 to update the correction matrix. The memory 223 can store, during subsequent iterations of the decoding of the codeword, the first bit and the tenth bit provided by the XOR gates 226 to update the correction matrix responsive to receipt of the first bit and the tenth bit from the decision engine 222 and not the remainder of the bits provided by the XOR gates 226.

In subsequent iterations of the decoding of the codeword, the AND gates 225 can provide the correction matrix that was updated in a first iteration of the decoding of the codeword. The updating the correction matrix in the first iteration of the decoding of the codeword can cause the registers 224 to store a bit having a second bit-value. The second bit-value, can be provided to the AND gates 225 from the registers 224, can cause the AND gates 225 to provide the correction matrix instead of generating the predetermined correction matrix. The decision engine 222 can receive the correction matrix and can utilize the correction matrix to continue to decode the codeword. The decoding of the codeword can include the correction of errors found in the codeword and/or the decoded codeword.

The decision engine 222 can, responsive to updating a particular bit of the codeword, provide a corresponding write enable bit having a second bit-value to the memory 223. The decision engine 222 can provide the write enable bits directly to the memory 223 without providing the bits to the OR gate 229 and/or the OR gates 231 after the correction matrix has been updated for the first time (e.g., after a first iteration of the decoding of the codeword). The decision engine 222 can also provide the write enable bits to the XOR gates 226. The XOR gates 226 can flip corresponding bits from the correction matrix and can provide the flipped bits to the memory 223. In various instances, the XOR gates 226 can flip each of the bits of the correction matrix and can provide each of the flipped bits to the memory 223. The memory 223 writes the received and stores flipped bits that are write enabled as indicated by the write enabled bits having a second bit-value as received from the decision engine 222. At the conclusion of the decoding of the codeword, the control circuitry 228 can reset the registers 224 to inactivate the correction matrix. The correction matrix is not reset and as a result the correction matrix can have bits leftover from the decoding of the codeword even at the initiation of the decoding of a subsequent codeword. Refraining from resetting (e.g., resetting) the correction matrix can save the memory sub-system resources and power.

Although non-limiting examples herein are generally described in terms of applicability to memory sub-systems and/or to memory devices, embodiments are not so limited, and aspects of the present disclosure can be applied as well to a system-on-a-chip, computing system/sub-system, data collection and processing, storage, networking, communication, power, artificial intelligence, control, telemetry, sensing and monitoring, digital entertainment and other types of system/sub-system and/or devices. Accordingly, aspects of the present disclosure can be applied to these components in order to resetting a variable, as described herein.

The examples described herein can be applicable to different algorithms unrelated to decoding. For example, the decision engine 222 can be referred to as a processing device. The examples described herein can be applicable to the initializing of any variable that is utilized by a processing device and/or updated by the processing device. For instance, a counter can be initialized prior to being provided to the processing device. The variable can be initialized as described herein without modifying the memory 223. In various instances, the processing device can utilize variables to encode a message. The variables can be initialized prior to the processing device utilizing the variables to encode a message utilizing the circuitry described herein.

The examples described herein are applicable to various types of memory and/or storage devices. For example, predetermined variables (e.g., predetermined correction matrix) can be generated using one or more AND gates and provided to a processing device instead of initializing and reading corresponding variables from memory, register, arrays, storage devices, and/or files of any type. For example, although the examples described herein are given in the context of hardware circuitry, predetermined variables can be generated utilizing computer readable instructions that utilize one or more AND operations to generate the predetermined variables. The predetermined variables can be provided to a processing device. The processing device can cause an updated variable to be stored in a file (e.g., computer file) prior to reading the updated variable from the file. Although the examples described herein are provided in the context of hardware circuitry, including AND gates, OR gates, and/or XOR gates, the examples described herein can be implemented with corresponding operations such as AND operations, OR operations, and/or XOR operations.

The examples described herein are also applicable to read-modify-write operations. A read-modify-write operation is one or more operations that cause data to be read from memory, that cause the data to be modified, and that cause updated data to be written to the memory. The initial reading of the data can be bypassed by generating predetermined data. In many instances, generating predetermined data can utilize less resources than initializing and reading the data. The predetermined data can be generated when the data is not utilized. For instance, the data may not be needed between the performance of a first plurality of operations and the performance of a second plurality of operations. The predetermined data may be generated during the transition between the performance of the first plurality of operations and the performance of the second plurality of operations. The predetermined data can be utilized to generate updated data which can be stored to the memory negating the reading and/or initialization of the data stored in the memory.

In various instances, the examples described herein are applicable for generating predetermined data in the areas of decoding, encoding, telemetry, performance counters use, timing/scheduling counters use, quality of service (QOS), and/or priority and arbitration counter use. The examples described herein are also applicable for generating predetermined data in the areas of matrix operations, encryption, decryption, scrambling, and/or interrupt maps, etc. For example, in the QoS area a predetermined QoS definition can be created instead of initializing and reading a QoS definition from a memory utilizing a plurality of AND gates and/or AND operations as described herein.

FIG. 3 is a flow diagram corresponding to a method 380 for resetting a correction matrix in accordance with some embodiments of the present disclosure. The method 380 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 380 is performed by the decoding circuitry 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 380 includes performing a decoding operation. As described above, the decoding operation can be performed by utilizing a correction matrix during operations to decode a bit string and/or a codeword. As described above, the decoding operation can be performed to correct one or more bit-flip errors within the bit string(s) and/or the codeword(s) described herein.

At operation 381, a command to read a correction matrix comprising multiple bit-values from memory of a decoder can be received. In various instances, the memory can receive the command. The command can originate at a decision engine and/or at control circuitry of the memory sub-system that includes the decoder. The command can originate external to the memory sub-system.

At operation 382, responsive to receipt of the command, a predetermined correction matrix including a same bit-value can be generated using circuitry of the decoder. For example, a predetermined correction matrix can include bits having a first bit-value (e.g., 0-bit). The predetermined correction matrix can be generated responsive to the correction matrix not having been modified previously. For example, the correction matrix may not have been modified during the performance of a decoding of a codeword associated with the correction matrix. At operation 383, the predetermined correction matrix can be provided to the decision engine to perform the decoding operation.

In various instances, the predetermined correction matrix can be provided instead of providing the correction matrix. For example, if the correction matrix has not been modified in the decoding of the codeword, then the predetermined correction matrix can be provided to the decision engine. If the correction matrix has been modified in the decoding of the codeword, then the correction matrix can be provided to the decision engine instead of generating a predetermined correction matrix.

The predetermined correction matrix can also be generated instead of resetting the correction matrix. The generating of the predetermined correction matrix can be equal to the reset correction matrix. For example, a reset correction matrix and a predetermined correction matrix can include bits having a first bit-value (e.g., 0-bit). Both the reset correction matrix and the predetermined correction matrix can include a same quantity of bits. The predetermined correction matrix can also be generated instead of reading the correction matrix. The predetermined correction matrix can be generated instead of resetting and reading the correction matrix from the memory. Generating the predetermined correction matrix can utilize less resources than resetting and reading the correction matrix.

The correction matrix stored in the memory, prior to being updated, can be generated by performing a decoding operation to decode a different bit string. Decoding the different bit string can include updating a correction matrix. At the end of the decoding operation performed to decode the different bit string, the correction matrix is not reset. The correction matrix is not reset at the beginning of the decoding operation performed to decode the bit string. The correction matrix can be left over from decoding the different bit string even though the bit string is currently being decoded. The correction matrix is not provided to the decision engine because the correction matrix is left over from a previous decoding operation. Instead, the predetermined correction matrix can be generated and provided to the decision engine.

The predetermined correction matrix can be generated utilizing at least an AND gate. For example, the predetermined correction matrix can be generated utilizing a plurality of AND operations. The quantity of AND operations performed by the AND gates can be equal to the quantity of bits of a correction matrix. The predetermined correction matrix can be generated utilizing an AND gate and a bit-mask. The bit-mask, stored in the registers, can be utilized to activate or deactivate the correction matrix. The predetermined correction matrix can be generated if the correction matrix is deactivated. The predetermined correction matrix may not be generated if the correction matrix is active. Each of the AND gates can receive the same bit-mask from the registers and a different bit from the correction matrix. The bit-mask can be utilized to mask the correction matrix utilizing the AND gates.

In examples where the predetermined correction matrix includes bits having a first value (e.g., 0-bit), AND gates can be utilized to generate the predetermined correction matrix. In examples where the predetermined correction matrix includes bits having a second value (e.g., 1-bit), OR gates can be utilized to generate the predetermined correction matrix. The OR gates can receive a same bit-mask and different bits from the correction matrix.

In various instances, a number of registers can store a bit-mask. For example, a register can store a bit which is the bit-mask. An array of memory cells can store a correction matrix that includes a first plurality of bits. Circuitry coupled to the array can include an AND gate. The circuitry can alter, during an iteration of a decoding operation performed to decode a codeword, the first plurality of bits of the correction matrix from a second value to a first value utilizing the bit-mask to generate a second plurality of bits. The bits of the correction matrix may have a second value while the bits of the second plurality of bits have a first value.

The second plurality of bits can be provided to a decision engine. The decision engine coupled to the first circuitry, the array, and the plurality of registers can update the bit-mask responsive to updating the codeword. Responsive to updating the codeword utilizing the second plurality of bits, the bit-mask can be updated to reflect that the codeword is updated. Changes to the bit-mask activate the first plurality of bits such that the first plurality of bits are not altered by the circuitry during subsequent iterations of the decoding operation.

The decision engine is further configured to, responsive to updating the codeword, update the first plurality of bits stored in the array of memory cells. The bit-mask and the first plurality of bits can be updated concurrently. As used herein, concurrence describes an action being taken at the same time or relatively the same time. The decision engine can update the bit-mask by updating a bit of the bit-mask. The bit of the bit-mask and/or the bit-mask can be associated with an address that corresponds to the first plurality of bits.

The decision engine can update the first plurality of bits in the array utilizing XOR gates. The XOR gates can be utilized to flip bits of the output of the AND gates. For example, in a first iteration, the XOR gates can flip bits of the predetermined correction matrix. In subsequent iterations, the XOR gates can flip bits of the correction matrix. The XOR gates can provide the updated correction matrix or the updated predetermined correction matrix to the memory. The memory can store the updated predetermined correction matrix or portions of the updated codeword based on the identification provided by the decision engine of corresponding bits of the codeword that were updated (e.g., flipped). A different circuitry (e.g., pipeline circuitry) can align the second plurality of bits with one or more signals provided by the decision engine indicating that the codeword is updated at the XOR gate to update the first plurality of bits. In various instances, the bit-mask can be utilized to open an AND gate to read the updated first plurality of bits in a subsequent iteration of the decoding operation. For example, the AND gate(s) can receive and provide the updated first plurality of bits without modifying the updated first plurality of bits in a subsequent iteration of the decoding operation.

In various instances, responsive to receipt of a command to read the correction matrix, a first plurality of bits of the correction matrix can be read if a bit-mask stored in registers comprises a second value. Responsive to receipt of a command to process the codeword, a second plurality of bits can be generated utilizing a plurality of AND gates if the bit-mask includes a first value. The first plurality of bits and the second plurality of bits can be provided to perform a number of operations utilizing the correction matrix. The first plurality of bits and the second plurality of bits can be provided to the decision engine, a device external to the decoder but internal to the memory sub-system, and/or a device external to the memory sub-system. For example, the first plurality of bits and the second plurality of bits can be provided to a host.

The bit-mask can be reset responsive to providing the first plurality of bits and the second plurality of bits. For example, the bit-mask can be reset at the conclusion of the decoding of a codeword. The first plurality of bits and the second plurality of bits can be provided to terminate a decoding of the codeword. The correction matrix may not be reset responsive to initiating a decoding of a different codeword or concluding of the decoding of the codeword. Responsive to initiating the decoding of the different codeword, a third plurality of bits can be generated utilizing the AND gates and an updated bit-mask. The third plurality of bits is composed of the same bit-value.

Figure 4:
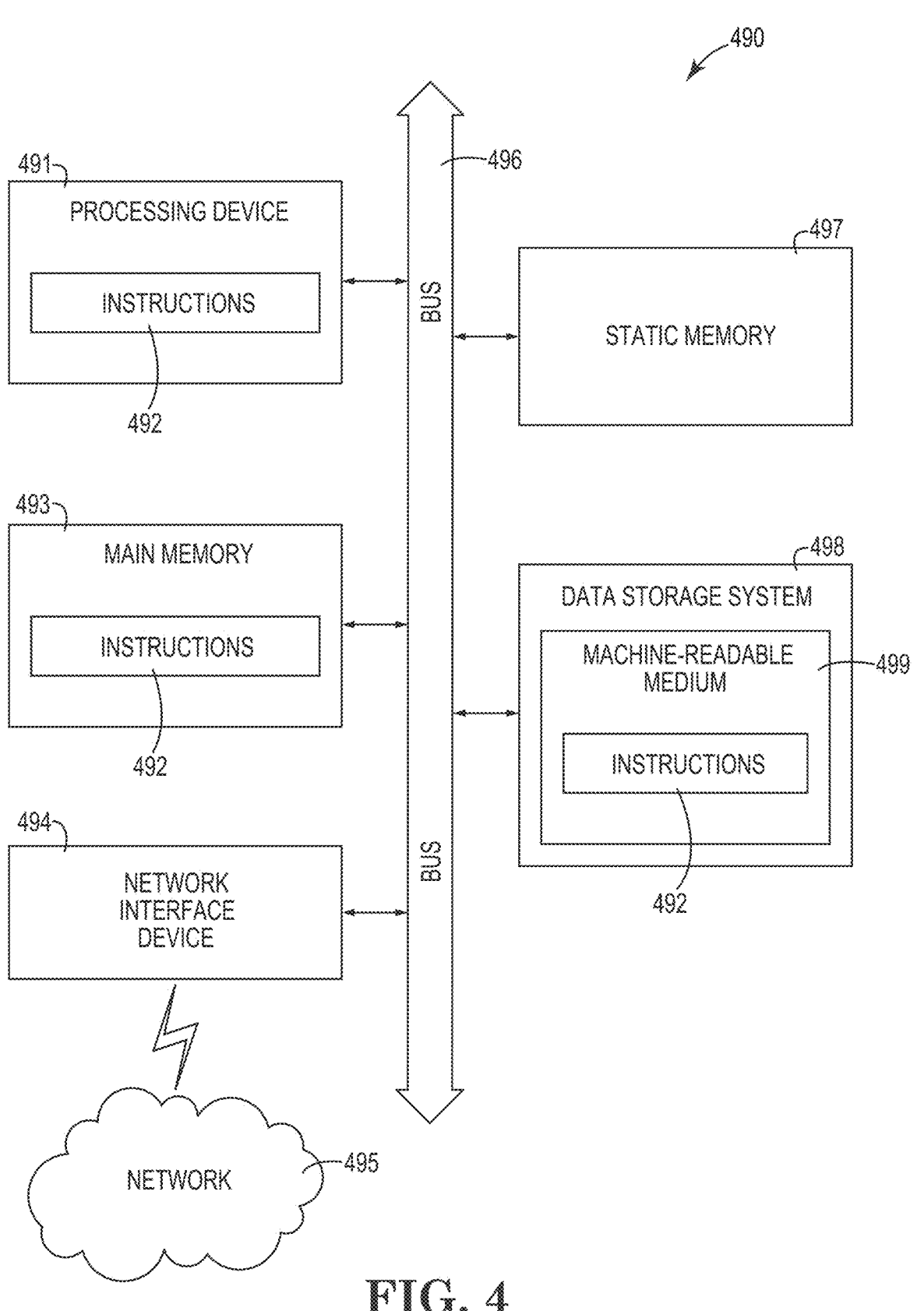
FIG. 4 is a block diagram of an example computer system in which embodiments of the present disclosure may operate.

FIG. 4 is a block diagram of an example computer system in which embodiments of the present disclosure may operate. For example, FIG. 4 illustrates an example machine of a computer system 490 within which a set of instructions, for causing the machine to perform any one or more of the methodologies discussed herein, can be executed. In some embodiments, the computer system 490 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the decoding circuitry 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 490 includes a processing device 491, a main memory 493 (e.g., read-only memory (ROM), flash memory, dynamic random access memory (DRAM) such as synchronous DRAM (SDRAM) or Rambus DRAM (RDRAM), etc.), a static memory 497 (e.g., flash memory, static random access memory (SRAM), etc.), and a data storage system 498, which communicate with each other via a bus 430.

The processing device 491 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 491 can also be one or more special-purpose processing devices such as an application specific integrated circuit (ASIC), a field programmable gate array (FPGA), a digital signal processor (DSP), network processor, or the like. The processing device 491 is configured to execute instructions 492 for performing the operations and steps discussed herein. The computer system 490 can further include a network interface device 494 to communicate over the network 495.

The data storage system 498 can include a machine-readable storage medium 499 (also known as a computer-readable medium) on which is stored one or more sets of instructions 492 or software embodying any one or more of the methodologies or functions described herein. The instructions 492 can also reside, completely or at least partially, within the main memory 493 and/or within the processing device 491 during execution thereof by the computer system 490, the main memory 493 and the processing device 491 also constituting machine-readable storage media. The machine-readable storage medium 499, data storage system 498, and/or main memory 493 can correspond to the memory sub-system 110 of FIG. 1.

In one embodiment, the instructions 492 include instructions to implement functionality corresponding to syndrome decoding circuitry (e.g., the decoding circuitry 113 of FIG. 1). While the machine-readable storage medium 499 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

21

22

What is claimed is:

1. A method, comprising:

performing a first iteration of a decoding operation on a bit string by:

receiving a command to read a correction matrix comprising multiple bit-values from memory of a decoder;

responsive to receipt of the command, generating, using circuitry of the decoder, a predetermined correction matrix comprising a same bit-value by:

altering a first plurality of bits of the correction matrix from a second value to a first value utilizing a bit-mask to generate a second plurality of bits that comprise the predetermined correction matrix;

providing the predetermined correction matrix to a decision engine to perform the decoding operation; and responsive to updating the bit string utilizing the second plurality of bits, update the bit-mask to reflect that the codeword is updated.

2. The method of claim 1, further comprising providing the predetermined correction matrix instead of providing the correction matrix to the decision engine.

3. The method of claim 1, further comprising generating the predetermined correction matrix instead of resetting the correction matrix prior to receipt of the command to read the correction matrix.

4. The method of claim 1, further comprising generating the predetermined correction matrix instead of reading the correction matrix.

5. The method of claim 1, further comprising generating the correction matrix by performing the decoding operation to decode a different bit string.

6. The method of claim 1, further comprising generating the predetermined correction matrix utilizing at least an AND gate, wherein the AND gate receives a bit from the correction matrix.

7. The method of claim 1, further comprising generating the predetermined correction matrix utilizing an AND gate and the bit-mask, wherein the AND gate receives the bit-mask and a bit from the correction matrix.

8. The method of claim 1, further comprising generating the predetermined correction matrix utilizing an OR gate, wherein the OR gate receives a bit from the correction matrix.

9. The method of claim 1, further comprising generating the predetermined correction matrix utilizing an OR gate and the bit-mask, wherein the OR gate receives the bit-mask and a bit from the correction matrix.

10. An apparatus, comprising:

a plurality of registers configured to store a bit-mask;

an array of memory cells configured to store a correction matrix that comprises a first plurality of bits; and circuitry coupled to the array and configured to:

alter, during an iteration of a decoding operation performed to decode a codeword, the first plurality of bits of the correction matrix from a second value to a first value utilizing the bit-mask to generate a second plurality of bits;

provide the second plurality of bits to a decision engine; and the decision engine coupled to the circuitry, the array, and the plurality of registers and configured to:

responsive to updating the codeword utilizing the second plurality of bits, update the bit-mask to reflect that the codeword is updated.

11. The apparatus of claim 10, wherein the decision engine is further configured to, responsive to updating the codeword, update the first plurality of bits stored in the array of memory cells.

12. The apparatus of claim 11, wherein the circuitry is further configured to utilize the bit-mask to open an AND gate to read the updated first plurality of bits in a subsequent iteration of the decoding operation.

13. The apparatus of claim 10, wherein the decision engine is further configured to update a bit of the bit-mask that is associated with an address that corresponds to the first plurality of bits.

14. The apparatus of claim 10, wherein the decision engine is further configured to update the first plurality of bits in the array utilizing an XOR gate.

15. The apparatus of claim 14, further comprises different circuitry configured to align the second plurality of bits with one or more signals provided by the decision engine indicating that the codeword is updated at the XOR gate to update the first plurality of bits.

16. An apparatus, comprising:

a plurality of registers configured to store a bit-mask;

an array of memory cells configured to store a correction matrix that comprises a first plurality of bits; and circuitry coupled to the array and the plurality of registers and configured to:

responsive to receipt of a command to read the correction matrix, read a first plurality of bits of the correction matrix if the bit-mask comprises a second value;

responsive to receipt of a command to process a codeword, generate a second plurality of bits utilizing a plurality of AND gates if the bit-mask comprises a first value; and provide the first plurality of bits and the second plurality of bits to perform a number of operations utilizing the correction matrix.

17. The apparatus of claim 16, further comprising a control circuitry configured to reset the bit-mask responsive to providing the first plurality of bits and the second plurality of bits.

18. The apparatus of claim 16, wherein the circuitry is further configured to provide the first plurality of bits and the second plurality of bits to terminate a decoding of the codeword.

19. The apparatus of claim 18, wherein the circuitry is further configured to refrain from resetting the correction matrix responsive to initiating a decoding of a different codeword.

20. The apparatus of claim 19, wherein the circuitry is further configured to, responsive to initiating the decoding of the different codeword, generate a third plurality of bits utilizing the plurality of AND gates and an updated bit-mask, wherein the third plurality of bits is composed of a same bit-value.

* * * * *